(12) United States Patent
Takami et al.

(10) Patent No.: US 7,892,680 B2
(45) Date of Patent: *Feb. 22, 2011

(54) NONAQUEOUS ELECTROLYTE SECONDARY BATTERY AND BATTERY MODULE

(75) Inventors: Norio Takami, Yokohama (JP); Hiroki Inagaki, Kawasaki (JP); Yoshinao Tatebayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/779,484

(22) Filed: May 13, 2010

(65) Prior Publication Data

US 2010/0221598 A1 Sep. 2, 2010

Related U.S. Application Data

(63) Continuation of application No. 12/273,256, filed on Nov. 18, 2008, now Pat. No. 7,745,049, which is a continuation of application No. 10/943,984, filed on Sep. 20, 2004, now Pat. No. 7,462,425.

(30) Foreign Application Priority Data

Sep. 26, 2003 (JP) ............................. 2003-336176

(51) Int. Cl.
*H01M 4/66* (2006.01)
(52) U.S. Cl. .................. 429/245; 429/163; 429/233; 429/231.5; 429/231.1; 429/231.95; 429/337
(58) Field of Classification Search .................. 429/245, 429/163, 233, 231.5, 231.1, 231.95, 337
See application file for complete search history.

(56) References Cited

U.S. PATENT DOCUMENTS

| 7,462,425 | B2 | 12/2008 | Takami et al. |
| 7,482,090 | B2 | 1/2009 | Tatebayashi et al. |
| 7,582,386 | B2 | 9/2009 | Takami et al. |
| 7,595,134 | B2 | 9/2009 | Inagaki et al. |
| 7,601,463 | B2 | 10/2009 | Inagaki et al. |
| 7,629,081 | B2 | 12/2009 | Inagaki et al. |
| 7,662,515 | B2 | 2/2010 | Inagaki et al. |
| 7,745,049 | B2 * | 6/2010 | Takami et al. ............... 429/245 |
| 2005/0064282 | A1 | 3/2005 | Inagaki et al. |
| 2005/0221188 | A1 | 10/2005 | Takami et al. |
| 2006/0068272 | A1 | 3/2006 | Takami et al. |
| 2006/0134520 | A1 | 6/2006 | Ishii et al. |
| 2006/0216600 | A1 | 9/2006 | Inagaki et al. |
| 2007/0009794 | A1 | 1/2007 | Takami et al. |
| 2007/0009798 | A1 | 1/2007 | Inagaki et al. |
| 2007/0059592 | A1 | 3/2007 | Takami et al. |
| 2007/0059602 | A1 | 3/2007 | Morishima et al. |
| 2007/0072080 | A1 | 3/2007 | Inagaki et al. |
| 2007/0231690 | A1 | 10/2007 | Fujita et al. |
| 2007/0231693 | A1 | 10/2007 | Inagaki et al. |
| 2007/0231702 | A1 | 10/2007 | Fujita et al. |
| 2007/0281214 | A1 | 12/2007 | Saruwatari et al. |
| 2008/0070115 | A1 | 3/2008 | Saruwatari et al. |
| 2008/0176142 | A1 | 7/2008 | Inagaki et al. |
| 2008/0241687 | A1 | 10/2008 | Ishii et al. |

FOREIGN PATENT DOCUMENTS

| JP | 2001-143702 | 5/2001 |
| JP | 2002-42889 | 2/2002 |
| KR | 2002-005970 | 7/2002 |
| KR | 2002-0077445 | 10/2002 |

* cited by examiner

*Primary Examiner*—Laura S Weiner
(74) *Attorney, Agent, or Firm*—Oblon, Spivak, McClelland, Maier & Neustadt, L.L.P.

(57) ABSTRACT

A nonaqueous electrolyte secondary battery includes a case, a nonaqueous electrolyte provided in the case, a positive electrode provided in the case, and a negative electrode provided in the case, the negative electrode comprising a negative electrode current collector and a negative electrode layer that is carried on the negative electrode current collector and contains negative electrode active material particles, and the negative electrode current collector comprising an aluminum foil having an average crystal grain size of 50 μm or less or an aluminum alloy foil having an average crystal grain size of 50 μm or less.

20 Claims, 3 Drawing Sheets

NONAQUEOUS ELECTROLYTE SECONDARY BATTERY AND BATTERY MODULE

CROSS-REFERENCE TO RELATED APPLICATIONS

This application is a continuation of U.S. Ser. No. 12/273,256, filed Nov. 18, 2008, now U.S. Pat. No. 7,745,049, which is a continuation of U.S. application Ser. No. 10/943,984, filed Sep. 20, 2004, now U.S. Pat. No. 7,462,425, and is based upon and claims the benefit of priority from prior Japanese Patent Application No. 2003-336176, filed Sep. 26, 2003, the entire contents of which are incorporated herein by reference.

BACKGROUND OF THE INVENTION

1. Field of the Invention

The present invention relates to a nonaqueous electrolyte secondary battery and a battery module.

2. Description of the Related Art

A nonaqueous electrolyte secondary battery having a negative electrode containing a lithium metal, a lithium alloy, a lithium compound or a carbon material has been intensively researched and developed as a high energy density battery or high output density battery. To date, lithium ion batteries having a positive electrode containing $LiCoO_2$ or $LiMn_2O_4$ as an active material and a negative electrode containing a carbon material for intercalating and deintercalating lithium have been put into practical use. For the negative electrode, it has been attempted to use a metal oxide or alloy instead of the carbon material. The current collector of the negative electrode is generally made of copper foil.

However, when a nonaqueous electrolyte secondary battery having a current collector made of copper foil is overdischarged, the dissolving reaction of the copper foil is promoted by potential elevation of the negative electrode, and the discharge capacity drops suddenly.

Accordingly, the nonaqueous electrolyte secondary battery is provided with a protective circuit board for preventing overdischarge. However, the nonaqueous electrolyte secondary battery provided with a protective circuit board is not advantageous from the viewpoint of energy density.

For example, Jpn. Pat. Appln. KOKAI Publication No. 2002-42889 discloses a nonaqueous electrolyte secondary battery comprising a negative electrode including a negative electrode current collector made of aluminum or aluminum alloy, and a negative electrode layer containing at least one negative electrode active material selected from the group consisting of a metal, an alloy and a compound for intercalating and deintercalating lithium. As a result, a nonaqueous electrolyte secondary battery enhanced in energy density and overdischarge cycle performance is realized.

However, since the negative electrode current collector made of aluminum foil or aluminum alloy foil proposed in Jpn. Pat. Appln. KOKAI Publication No. 2002-42889 is weak in strength, it may be broken when the pressing force is increased in order to enhance the negative electrode density. Therefore, according to the conventional negative electrode current collector, a thin negative electrode of high density cannot be obtained, thus and it has been difficult to increase the capacity of the nonaqueous electrolyte secondary battery.

Further, in the nonaqueous electrolyte secondary battery having the negative electrode containing the negative electrode current collector disclosed in the patent publication, when overdischarged in a high temperature environment, the negative electrode current collector reacts with the nonaqueous electrolyte, and is dissolved to deposit on the negative electrode. As a result, the current collecting performance of the negative electrode is lowered, and the electrode resistance increases, so that a sufficient charge and discharge cycle life cannot be obtained.

BRIEF SUMMARY OF THE INVENTION

An object of an embodiment of the present invention is to provide a nonaqueous electrolyte secondary battery excellent in battery capacity characteristic and cycle performance even in the condition of high temperature environment, rapid charging, and high rate discharging.

According to first aspect of the present invention, there is provided a nonaqueous electrolyte secondary battery in an embodiment of the invention, comprising a case;
a nonaqueous electrolyte provided in the case;
a positive electrode provided in the case; and
a negative electrode provided in the case, the negative electrode comprising a negative electrode current collector and a negative electrode layer that is carried on the negative electrode current collector and contains negative electrode active material particles, and the negative electrode current collector including an aluminum foil having an average crystal grain size of 50 μm or less or an aluminum alloy foil having an average crystal grain size of 50 μm or less.

According to second aspect of the present invention, there is provided a battery module in an embodiment of the invention, comprising a series connection unit having a plurality of single cells connected in series, each single cell comprising:
a case;
a nonaqueous electrolyte provided in the case;
a positive electrode provided in the case; and
a negative electrode provided in the case, the negative electrode comprising a negative electrode current collector and a negative electrode layer that is carried on the negative electrode current collector and contains negative electrode active material particles, and the negative electrode current collector including an aluminum foil having an average crystal grain size of 50 μm or less or an aluminum alloy foil having an average crystal grain size of 50 μm or less.

DETAILED DESCRIPTION OF THE INVENTION

Figure 1:
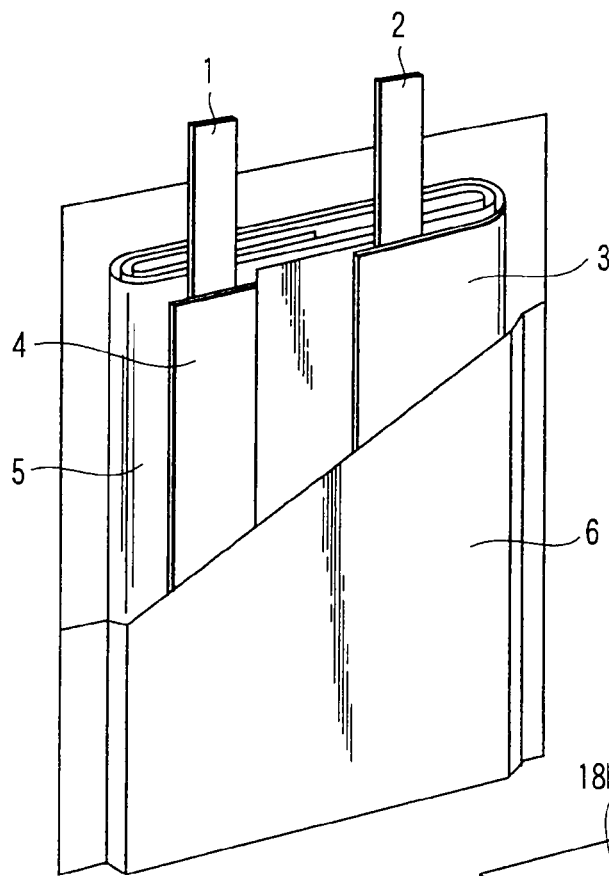
FIG. 1 is a partially cut-away sectional view of a nonaqueous electrolyte secondary battery according to an embodiment of the invention.

The inventors have undertaken much research, and found that the size of crystal grains composing fine textures is related to the strength of a negative electrode current collector including an aluminum foil or an aluminum alloy foil, and that both physical strength and chemical strength of such a negative electrode current collector can be enhanced by controlling the average crystal grain size at 50 µm or less.

A negative electrode current collector comprises an aluminum foil of which the average crystal grain size is over 50 µm, or an aluminum alloy foil of which the average crystal grain size is over 50 µm is low in manufacturing cost, but has a large or wide grain boundary because of its large crystal grain size. Accordingly, when the negative electrode current collector is formed thinly at a thickness of 7 µm or less, pin holes and cracks are likely to occur, so that a charge and discharge cycle life in a high temperature environment may be short.

To obtain a thin negative electrode having a high density, if the pressing force is increased when manufacturing, the negative electrode current collector is pressed firmly in the thickness direction. If the crystal grain boundaries of the fine texture are large or wide in the negative electrode current collector, the tensile strength of the negative electrode current collector is lowered, and therefore, when a strong pressing force is applied, the negative electrode current collector is broken.

As studied and disclosed by the inventors, when the negative electrode current collector is made of copper, aluminum of which the average crystal grain size is over 50 µm, or aluminum alloy of which the average crystal grain size is over 50 µm, and the pressing force is raised in manufacture of a negative electrode, the negative electrode current collector is dissolved by electrochemical reaction with a nonaqueous electrolyte in the long overdischarging cycle in a high temperature environment of 40° C. or higher. The negative electrode current collector was more likely to be dissolved at the battery voltage of 0V or less, in particular. The inventors have also learned that dissolution of the negative electrode current collector into the nonaqueous electrolyte by overdischarge in a high temperature environment can be suppressed by forming the negative electrode current collector by using aluminum of which the average crystal grain size is 50 µm or less, or aluminum alloy of which the average crystal grain size is 50 µm or less. As a result, since increase of electrode resistance can be suppressed, a charge and discharge cycle life can be increased even if overdischarge is repeated in a high temperature environment.

At the same time, since the negative electrode current collector used in the invention has small or narrow crystal grain boundaries, and the tensile strength can be enhanced, breakage of the current collector at the time of pressing can be suppressed, and a thin negative electrode of high density can be realized. Moreover, this negative electrode current collector also suppresses generation of pin holes. Active material particles having an average primary particle size of 1 µm or less can shorten the diffusion time of lithium ions, but are inferior in filling performance, so that a greater pressing force is required for obtaining high density. Since the negative electrode current collector is not broken if such a high pressure is applied, the density of the negative electrode containing the negative electrode active material can be sufficiently raised. As a result, a nonaqueous electrolyte secondary battery of high capacity, and excellent cycle performance in the condition of rapid charging and high rate discharging can be realized.

Further, by using lithium titanium composite oxide particles having such primary particle size as the negative electrode active material, a nonaqueous electrolyte secondary battery excellent in cycle performance in the condition of high temperature environment, rapid charging, and high rate discharging, and high in capacity can be obtained.

The lithium titanium composite oxide can suppress reaction with the nonaqueous electrolyte in the high temperature environment, and hence self-discharge in the high temperature environment can be suppressed. In addition, the lithium titanium composite oxide is small in the degree of expansion and contraction due to intercalation and deintercalation of lithium, and hence can suppress rapid expansion or contraction of the negative electrode in the event of repetition of rapid charging, and structural breakage of the negative electrode active material can be suppressed in the event of repetition of rapid charging.

By controlling the average primary particle size of the lithium titanium composite oxide at 1 µm or less, the diffusion time of lithium ions can be shortened and specific surface area can be enhanced, so that a high utilization factor is obtained even in the case of rapid charging or high rate discharging.

Further, by using a negative electrode current collector including an aluminum foil having an average crystal grain size of 50 µm or less or an aluminum alloy foil having an average crystal grain size of 50 µm or less, the negative electrode density can be enhanced even by using such an active material.

As a result, a nonaqueous electrolyte secondary battery excellent in cycle performance in the conditions of high temperature environment, rapid charge, and high rate discharge, and high in capacity can be obtained. Therefore, an ideal nonaqueous electrolyte secondary battery can be provided for use as a secondary battery replacing a lead battery used as a starter power source for vehicle, a vehicle-mounted secondary battery to be used in an electric vehicle or hybrid car, or a secondary battery for storing electric power used in leveling of electric power.

The negative electrode, positive electrode, and nonaqueous electrolyte will be explained below.

1) Negative Electrode

The negative electrode comprises a negative electrode current collector, and a negative electrode layer carried on one surface or both surfaces of the negative electrode current collector. The negative electrode layer includes a negative electrode active material, a conductive agent and a binder.

The negative electrode current collector includes an aluminum foil or an aluminum alloy foil, and its average crystal grain size is 50 µm or less.

Since the range of the average crystal grain size is 50 µm or less, as mentioned in the embodiment, the strength of the aluminum foil or aluminum alloy foil can be greatly enhanced. By this increase in strength of the negative electrode current collector, physical and chemical stability is enhanced, and the negative electrode current collector does not break down. In particular, even if the overdischarge cycle in the high temperature environment of 40° C. or more is repeated, deterioration due to dissolution of the negative electrode current collector can be prevented, and increase of electrode resistance can be suppressed. Further, by suppressing the increase of the electrode resistance, Joule heat is lowered, and heat generation of the electrode can be suppressed.

Owing to the increase in strength of the negative electrode current collector, the negative electrode can be increased in density without breaking down the negative electrode current collector, and the energy density is increased. Due to the high density of the negative electrode, the heat conductivity is increased, and heat releasing performance of the electrode is improved.

Further, by the synergistic effect of suppression of heat generation of the battery and improvement of heat releasing performance of the electrode, temperature rise of the battery can be suppressed.

A more preferable average crystal grain size is 3 μm or less. As mentioned in the examples, these effects are further enhanced. The smaller the average crystal grain size, the higher becomes the chemical and physical strength of the negative electrode current collector.

However, since a fine texture having a crystallinity is desired for obtaining an excellent conductivity, the lower limit of the average crystal grain size is preferred to be 0.01 μm.

Aluminum foil or aluminum alloy foil having an average crystal grain size in a range of 50 μm or less varies depending on many factors such as material composition, processing condition, heating condition and cooling condition, and the average crystal grain size can be adjusted by factors in the manufacturing process. As aluminum foil of the negative electrode current collector, high performance aluminum foil PACAL21 (tradename of Japan Foil) can be used.

More specifically, an aluminum foil having an average crystal grain size of 50 μm or less can be manufactured by annealing an aluminum foil having an average crystal grain size of 90 μm at 50 to 250° C., and quenching to room temperature. On the other hand, an aluminum alloy foil having an average crystal grain size of 50 μm or less can be manufactured by annealing an aluminum alloy foil having an average crystal grain size of 90 μm at 50 to 250° C., and quenching to room temperature. Or an aluminum alloy foil having an average crystal grain size of 50 μm or less can be manufactured also by annealing an alloy containing Fe by 0.8 to 2 wt. %.

The average crystal grain size of aluminum and aluminum alloy is measured by the following method. Textures of a surface of the negative electrode current collector are observed by a metallographic microscope, the number of crystal grains existing within a viewing field of 1 mm.times.1 mm is counted, and the average crystal grain area S (μm$^2$) is calculated by formula (0).

$$S=(1\times10^6)/n \quad (0)$$

where $(1\times10^6)$ is viewing field area (μm$^2$) of 1 mm×1 mm, and n is the number of crystal grains.

Using the obtained average crystal grain area S, the average crystal grain diameter d (μm) is calculated by formula (1). The average crystal grain diameter d was calculated in five positions (five viewing fields), and the average was obtained as the average crystal grain size. An assumed error is about 5%.

$$d=2(S/\pi)^{1/2} \quad (1)$$

The thickness of the negative electrode current collector is preferred to be 20 μm or less for the purpose of high capacity. A more preferred range is 12 μm or less. The lower limit of the thickness of the negative electrode current collector is preferred to be 3 μm or less.

Purity of aluminum for use in the negative electrode current collector is preferred to be 99.99% or higher for the purpose of enhancing the corrosion resistance and increasing the strength. An aluminum alloy is preferably an alloy containing aluminum and at least one element selected from the group consisting of iron, magnesium, zinc, manganese, and silicon. For example, Al—Fe alloy, Al—Mn alloy, and Al—Mg alloy can have a higher strength than aluminum. On the other hand, the content of a transition metal such as nickel or chromium contained in aluminum and aluminum alloy is preferred to be 100 ppm or less (including 0 ppm). For example, Al—Cu alloy is increased in strength, but is lowered in corrosion resistance, thus is not suited as a current collector.

Aluminum content in aluminum alloy is preferred to be 95 wt. % or more and 99.5 wt. % or less. If out of this range, even if the average crystal grain size is set to 50 μm or less, sufficient strength may not be obtained. A more preferable content of aluminum is 98 wt. % or more and 99.5 wt. % or less.

The average primary particle size of the negative electrode active material is preferred to be 1 μm or less.

Thus, as described below in the examples, the cycle performance can be enhanced. In particular, this effect is outstanding in high rate discharging. This is because, in the negative electrode active material for intercalating and deintercalating lithium ions, for example, the diffusion distance of lithium ions in the active material becomes shorter and the specific surface area becomes wider as the particle size becomes smaller.

A more preferable average primary particle size is 0.3 μm or less. As mentioned in the examples, these effects are further enhanced. However, when the average primary particle size is smaller, primary particles are more likely to aggregate, and the distribution of nonaqueous electrolyte is biased to the negative electrode, and depletion of electrolyte in the positive electrode is likely to occur, and hence the lower limit is preferred to be 0.001 μm.

Generally, in the process of pressing an electrode, as the average particle size of the active material becomes smaller, the load on the current collector increases. Since the negative electrode active material has an average primary particle size of 1 μm or less, the load on the current collector is large, and breakage is likely to occur in the conventional negative electrode current collector. However, since the negative electrode current collector used in the invention is high in strength, it can withstand the load due to particles having an average primary particle size of 1 μm or less.

The negative electrode active material having an average primary particle size of 1 μm or less can be obtained by synthesizing an active material precursor from a raw active material, baking, and grinding by using a grinding machine such as a ball mill or jet mill. In the baking process, part of the active material precursor may be aggregated to grow into secondary particles with larger particle size. Hence, the negative electrode active material can contain secondary particles. It is easier to grind if the powder is smaller in particle size, and the active material precursor is preferred to be powder of 1 μm or less.

As the negative electrode active material, a substance for intercalating and deintercalating lithium may be used. In particular, metal oxide, metal sulfide, metal nitride, and alloys may be used. The Metal oxide includes, for example, tungsten oxide such as $WO_3$, amorphous tin oxide such as $SnB_{0.4}P_{0.6}O_{3.1}$, tin silicon oxide such as $SnSiO_3$, silicon oxide such as $SiO$, and lithium titanate having a spinel structure such as $Li_{4+x}Ti_5O_{12}$. Preferred examples of the metal oxide are lithium titanium composite oxides such as lithium titanate. Preferable examples of the Metal sulfide include, for example, lithium sulfide such as $TiO_2$, molybdenum sulfide such as $MoS_2$, and iron sulfide such as $FeS$, $FeS_2$, $Li_xFeS_2$. Preferable examples of metal nitride include, for example, lithium cobalt nitride such as $Li_xCO_yN$ ($0<x\leq4$, $0\leq y\leq0.5$). In particular, from the viewpoint of cycle performance, lithium titanate is preferred. This is because the lithium intercalating potential of lithium titanate is about 1.5V, and is a stable material electrically and chemically in the presence of the aluminum foil current collector or aluminum alloy foil current collector.

The lithium intercalating potential of the negative electrode active material is preferred to be 0.4V or more in open circuit potential with respect to open circuit potential of lithium metal. Hence, promotion of an alloying reaction between an aluminum component of the negative electrode current collector and a lithium and pulverization of the negative electrode current collector can be suppressed. The lithium intercalating potential is more preferably in a range of 0.4V or more and 3V or less in open circuit potential with respect to open circuit potential of lithium metal. Hence, the battery voltage can be enhanced. A further preferred range is 0.4V or more and 2V or less.

Metal oxides capable of intercalating lithium in a range of 0.4V or more and 3V or less include a titanium oxide such as $TiO_2$, a lithium titanium composite oxide such as $Li_{4+x}Ti_5O_{12}$ ($-1 \leq x \leq 3$) or $Li_2Ti_3O_7$, a tungsten oxide such as $WO_3$, an amorphous tin oxide such as $SnB_{0.4}P_{0.6}O_{3.1}$, a tin silicon oxide such as $SnSiO_3$, and a silicon oxide such as $SiO$. In particular, a lithium titanium composite oxide is preferred.

Metal sulfides capable of intercalating lithium in a range of 0.4V or more and 3V or less include lithium sulfide such as $TiS_2$, molybdenum sulfide such as $MoS_2$, and iron sulfide such as $FeS$, $FeS_2$, $Li_xFeS_2$.

Metal nitrides capable of intercalating lithium in a range of 0.4V or more and 3V or less include lithium cobalt nitride such as $Li_xCo_yN$ ($0 \leq x \leq 4$, $0 \leq y \leq 0.5$).

As a conductive agent for enhancing the electron conductivity and suppressing contact resistance with the current collector, a carbon material may be used. Examples include acetylene black, carbon black, coke, carbon fiber, and graphite.

A binder for binding active material and conductive agent includes, for example, polytetrafluoroethylene (PTFE), polyvinylidene fluoride (PVdF), fluororubber, and styrene butadiene rubber.

The blending ratio of the negative electrode active material, conductive agent, and binder is 80 wt. % or more and 95 wt. % or less of the negative electrode active material, 3 wt. % or more and 18 wt. % or less of the conductive agent, and 2 wt. % or more and 7 wt. % or less of the binder. The conductive agent can exhibit its specified effect when contained by 3 wt. % or more, and can reduce decomposition of the nonaqueous electrolyte on the conductive agent surface in high temperature storage when contained by 18 wt. % or less. The binder can obtain a sufficient electrode strength when contained by 2 wt. % or more, and can decrease the insulation part of electrode when contained by 7 wt. % or less.

The density of the negative electrode is preferred to be 1.5 $g/cm^3$ or more and 5 $g/cm^3$ or less. Thus, a high battery capacity can be obtained. A more preferable range is 2 $g/cm^3$ or more and 4 $g/cm^3$ or less.

The negative electrode can be manufactured by suspending the negative electrode active material, conductive agent and binder in a proper solvent, applying this suspension on a current collector made of aluminum foil or aluminum alloy foil, and drying and pressing.

2) Positive Electrode

The positive electrode comprises a positive electrode current collector, and a positive electrode layer carried on one surface or both surfaces of the positive electrode current collector. The positive electrode layer includes a positive electrode active material, a conductive agent and a binder.

The positive electrode current collector includes an aluminum foil or an aluminum alloy foil. The average crystal grain size of aluminum foil or aluminum alloy foil is 50 μm or less. More preferably, it is 3 μm or less. As a result, the strength of the positive electrode current collector is increased, and the positive electrode is increased in density without breaking down the positive electrode current collector, so that the energy density can be enhanced. The smaller the average crystal gain size, the less is the occurrence of pin holes and cracks, and at the same time, the chemical strength and physical strength of the positive electrode current collector can be enhanced. In order to assure an appropriate hardness by using the current collector having a crystalline fine texture, the lower limit of the average crystal grain size is preferred to be 0.01 μm.

The thickness of the positive electrode current collector is preferred to be 20 μm or less for the purpose of high capacity. A more preferred range is 15 μm or less. The preferred lower limit of the thickness of the positive electrode current collector is 3 μm. Examples of the positive electrode active material include oxide, sulfide and polymer.

The oxide includes manganese dioxide ($MnO_2$), iron oxide, copper oxide, nickel oxide, lithium manganese composite oxide such as $Li_xMn_2O_4$ or $Li_xMnO_2$, lithium nickel composite oxide such as $Li_xNiO_2$, lithium cobalt composite oxide such as $Li_xCoO_2$, lithium nickel cobalt composite oxide such as $LiNi_{1-y}Co_yO_2$, lithium manganese cobalt composite oxide such as $LiMn_yCo_{1-y}O_2$, spinel type lithium manganese nickel composite oxide such as $Li_xMn_{2-y}Ni_yO_4$, olivine structure lithium phosphorus oxide such as $Li_xFePO_4$, $Li_xFe_{1-y}Mn_yPO_4$, or $Li_xCoPO_4$, iron sulfate such as $Fe_2(SO_4)_3$, and vanadium oxide such as $V_2O_5$. Values of x and y are preferred to be in a range of 0 to 1.

Polymer includes a conductive polymer material such as polyaniline and polypyrrole, and a disulfide polymer material. Further, sulfur (S) and carbon fluoride may be also used.

A preferred positive electrode active material is desired to have a high positive electrode voltage, and preferred examples include lithium manganese composite oxide such as $Li_xMn_2O_4$, lithium nickel composite oxide, lithium cobalt composite oxide, lithium nickel cobalt composite oxide, spinel type lithium manganese nickel composite oxide, lithium manganese cobalt composite oxide, and lithium iron phosphate such as $Li_xFePO_4$.

As a conductive agent for enhancing the electron conductivity and suppressing contact resistance with the current collector, for example, acetylene black, carbon black, and graphite may be used.

A binder for binding an active material and conductive agent includes, for example, polytetrafluoroethylene (PTFE), polyvinylidene fluoride (PVdF), and fluororubber.

The blending ratio of the positive electrode active material, conductive agent, and binder is 80 wt. % or more and 95 wt. % or less of the positive electrode active material, 3 wt. % or more and 18 wt. % or less of the conductive agent, and 2 wt. % or more and 7 wt. % or less of the binder. The conductive agent can exhibit its specified effect when contained by 3 wt. % or more, and can reduce decomposition of the nonaqueous electrolyte on the conductive agent surface in high temperature storage when contained by 18 wt. % or less. The binder can obtain a sufficient electrode strength when contained by 2 wt. % or more, and can decrease the insulation part of the electrode when contained by 7 wt. % or less.

The positive electrode can be manufactured by suspending the positive electrode active material, conductive agent and binder in an appropriate solvent, applying this suspension on a positive electrode current collector, and drying and pressing.

3) Nonaqueous Electrolyte

Examples of the nonaqueous electrolyte include a liquid nonaqueous electrolyte prepared by dissolving an electrolyte in an organic solvent, a gel nonaqueous electrolyte obtained by compounding a liquid electrolyte and a polymer material, and a solid nonaqueous electrolyte obtained by compounding a lithium salt and a polymer material. A room temperature molten salt (ionic fused material) containing lithium ion may be also used as a nonaqueous electrolyte.

A liquid nonaqueous electrolyte is prepared by dissolving an electrolyte in an organic solvent at a concentration of 0.5 to 2 mol/L.

Examples of electrolyte include $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, and $LiB[(OCO)_2]_2$. One or two or more types of electrolytes may be used.

Various organic solvents may be used, including cyclic carbonate such as propylene carbonate (PC) or ethylene carbonate (EC), chain carbonate such as diethyl carbonate (DEC), dimethyl carbonate (DMC) or methyl ethyl carbonate (MEC), chain ether such as dimethoxy ethane (DME) or diethoethane (DEE), cyclic ether such as tetrahydrofurane (THF) or dioxolane (DOX), γ-butyrolactone (GBL), acetonitrile (AN), and sulfolane (SL). These organic solvents may be used either alone or as mixture of two or more types.

Examples of a polymer material include polyvinylidene fluoride (PVdF), polyacrylonitrile (PAN), and polyethylene oxide (PEO).

A room temperature molten salt (ionic fused material) is desired to contain lithium ion, organic material cation, and organic material anion. A preferable room temperature molten salt is a liquid at 100° C. or less, and preferably at room temperature or less.

The nonaqueous electrolyte secondary battery according to one embodiment of the invention may further comprise a separator provided between a positive electrode and a negative electrode, and an outer package (case) for accommodating them.

4) Separator

The separator includes, for example, synthetic resin nonwoven fabric, polyethylene porous film, or polypropylene porous film.

5) Outer Package

An outer package is a laminate film case of film thickness of 0.2 mm or less, or metal case of wall thickness of 0.5 mm or less. The shape of the case should conform to the shape of the nonaqueous electrolyte secondary battery. The shape of the nonaqueous electrolyte secondary battery includes a flat type, prismatic type, cylindrical type, coin type, button type, sheet type, laminate type, and large type battery installed in an electric car.

A preferred thickness range of the laminate film is 0.5 mm or less. The lower limit of the laminate film thickness is 0.01 mm.

A preferred wall thickness range of the metal case is 0.5 mm or less. The lower limit of the wall thickness of the metal case is 0.05 mm.

The laminate film includes a multilayer film containing a metal layer, and a resin layer for covering the metal layer. For reduction of weight, the metal layer is preferred to be aluminum foil or aluminum alloy foil. The resin layer is intended to reinforce the metal layer, and may be made of a polymer such as polypropylene (PP), polyethylene (PE), nylon, or polyethylene terephthalate (PET).

A laminate film case is formed by processing laminate film by, for example, heat fusion.

The metal case is preferred to be formed of aluminum or aluminum alloy. An average crystal grain size of aluminum or aluminum alloy is preferred to be 50 μm or less. By controlling the average crystal grain size to 50 μm or less, the strength of the metal case made of aluminum or aluminum alloy is increased, and a sufficient mechanical strength can be assured if the wall thickness of the case is reduced. As a result, the heat releasing performance of the case is improved, and temperature rise of battery can be suppressed. By increased energy density, the battery can be reduced in weight and size. More preferably, it is 0.1 μm or more and 10 μm or less. As a result, these effects are further enhanced as described in the examples below. The smaller the average crystal grain size, the higher becomes the chemical and physical strength of the case. However, since fine textures are preferred to be crystalline in order to obtain an excellent conductivity, the lower limit of the average crystal grain size is preferred to be 0.01 μm.

These features are preferred in a battery, such as a vehicle-mounted secondary battery, where high temperature conditions are present and high energy density are demanded.

Owing to the same reason as in the negative electrode current collector, the purity of aluminum is preferred to be 99.99% or more. Aluminum alloy is preferably an alloy containing an element such as magnesium, zinc or silicon. In aluminum or aluminum alloy, the content of a transition metal such as iron, copper, nickel or chromium should be 100 ppm or less.

The metal case can be sealed by laser. Accordingly, as compared with the laminate film case, the volume of the sealing section can be reduced, and the energy density can be enhanced.

The nonaqueous electrolyte secondary battery of the invention can be applied in various types of nonaqueous electrolyte secondary battery, such as prismatic type, cylindrical type, flat type, thin type or coin type. FIG. 1 shows an example of a flat type nonaqueous electrolyte secondary battery.

This nonaqueous electrolyte secondary battery comprises a bag-shaped film case 6 as outer package, an electrode group accommodated in the film case, and a nonaqueous electrolyte held by the electrode group. The electrode group comprises a positive electrode 3, a negative electrode 4 and a separator 5 provided between the positive electrode 3 and the negative electrode 4. The positive electrode 3, the negative electrode 4 and the separator 5 are flatly wound. One end of a belt-like positive electrode terminal 2 is electrically connected to the positive electrode 3, and the other end is drawn outside of the case 6. One end of a belt-like negative electrode terminal 1 is electrically connected to the negative electrode 4, and the other end is drawn outside of the case 6.

Figure 2:
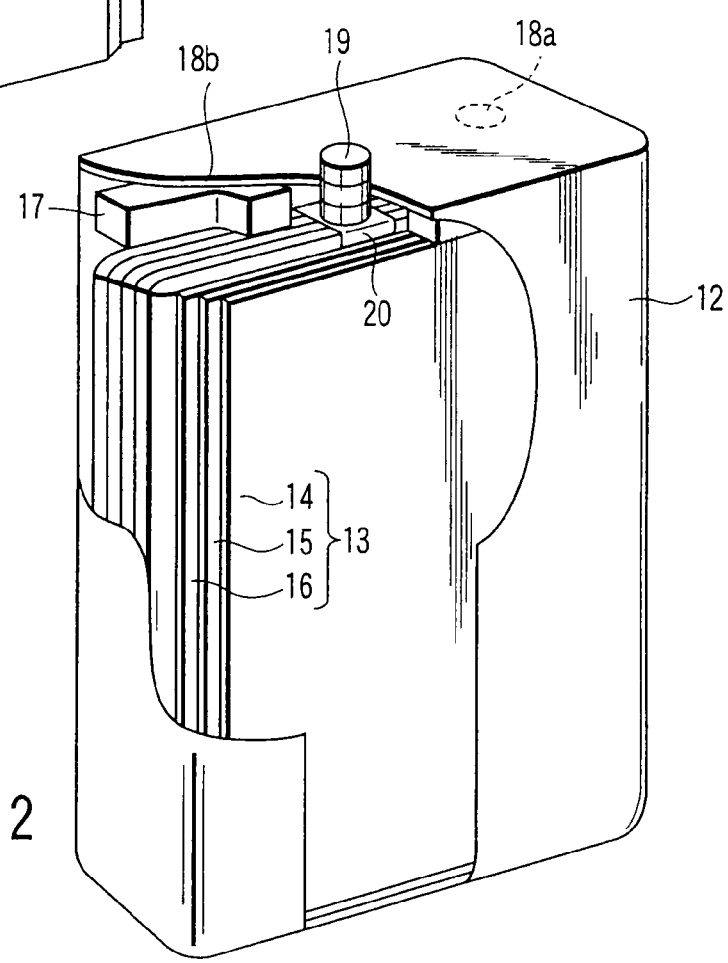
FIG. 2 is a partially cut-away sectional view of a nonaqueous electrolyte secondary battery according to another embodiment of the invention.

FIG. 2 shows one embodiment of a prismatic type nonaqueous electrolyte secondary battery.

As shown in FIG. 2, an electrode group 13 is accommodated in a prismatic tubular case 12 with a bottom made of aluminum or other metal. The electrode group 13 is formed by laminating a positive electrode 14, a separator 15, and a negative electrode 16 in this sequence, and winding flatly. A spacer 17 having a hole in the center is arranged above the electrode group 13.

A nonaqueous electrolyte is held in the electrode group 13. A sealing plate 18b having a feed port 18a with a circular hole opened in the center is welded by laser to the opening of a case 12. The feed port 18a is covered with a sealing lid (not shown). A negative electrode terminal 19 is arranged in the circular hole of the sealing plate 18b by way of hermetic seal. A negative electrode tab 20 drawn out from a negative electrode 16 is welded to the lower end of the negative electrode terminal 19. On the other hand, a positive electrode tab (not shown) is connected to the case 12 serving also as positive electrode terminal.

A battery module can be formed from a nonaqueous electrolyte secondary battery. One embodiment thereof will be shown in FIGS. 3 to 8.

Figure 3:
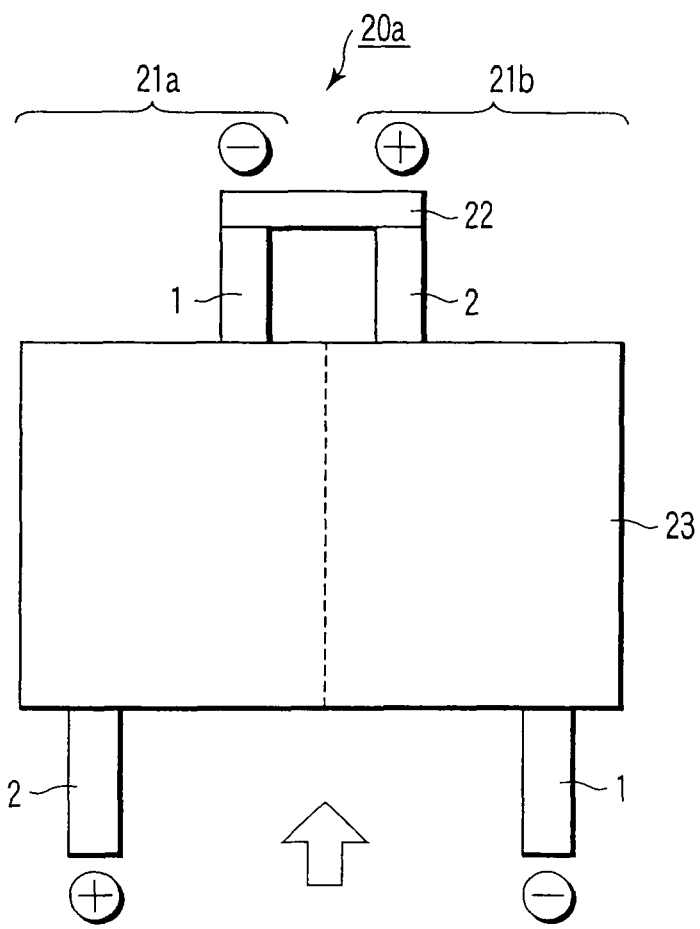
FIG. 3 is a plan view schematically showing a battery module according to an embodiment of the present invention.

As shown in FIG. 3, a battery module 20a is composed of a series connection unit having two single cells 21a, 21b connected in series. The single cells 21a, 21b each have the same structure as explained in FIG. 1, except that a negative electrode terminal 1 is drawn out from one shorter side of a case 6, and that a positive electrode terminal 2 is drawn out from the other shorter side of the case 6. The single cell 21a positioned at the left side is arranged with the negative electrode terminal 1 upside. On the other hand, the single cell 21b positioned at the right side is arranged with the positive electrode terminal 2 upside. The negative electrode terminal 1 of the single cell 21a and the positive electrode terminal 2 of the single cell 21b are electrically connected by means of a tab 22.

Figure 4:
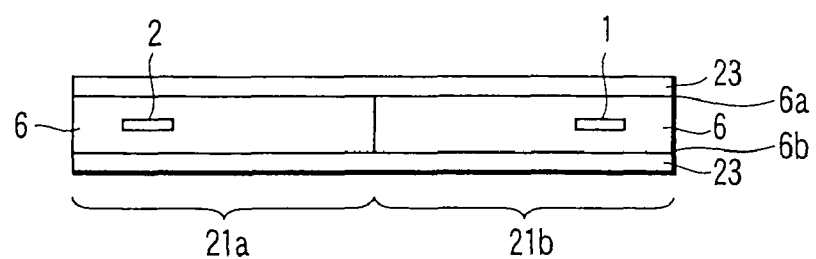
FIG. 4 is a side view of the battery module in FIG. 3 as seen from the lead projecting side.
Figure 5:
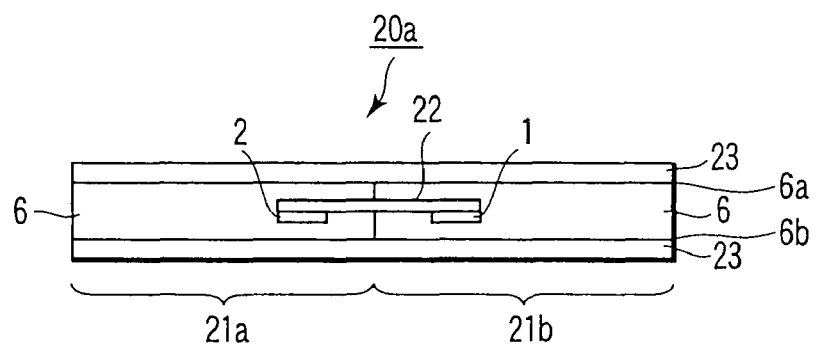
FIG. 5 is a side view of the battery module in FIG. 3 as seen from the opposite lead projecting side.

FIG. 4 is a side view of the battery module in FIG. 3 as seen from the arrow direction in FIG. 3. FIG. 5 is a side view of the battery module in FIG. 3 as seen from the tab 22 side. As shown in FIGS. 4 and 5, a cushion member 23 formed like a sheet is arranged on both principal planes of the series connection unit, that is, on the top 6a and bottom 6b of the cases 6 of the single cells 21a, 21b.

Figure 6:
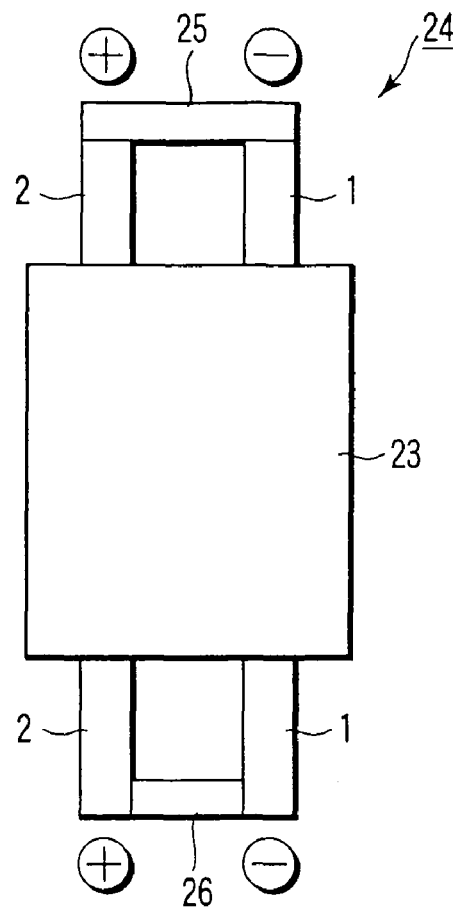
FIG. 6 is a plan view schematically showing a battery module according to another embodiment of the present invention.
Figure 7:
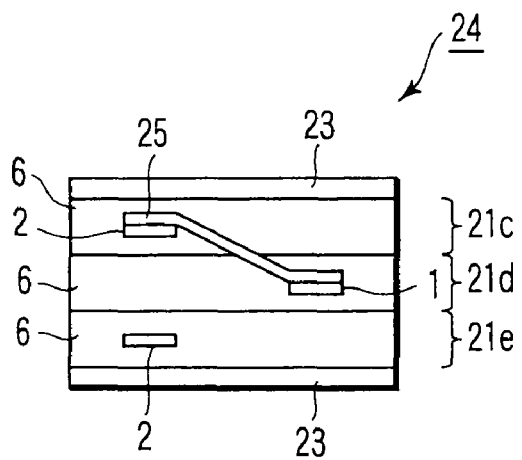
FIG. 7 is a side view of the battery module in FIG. 6 as seen from the lead projecting side.
Figure 8:
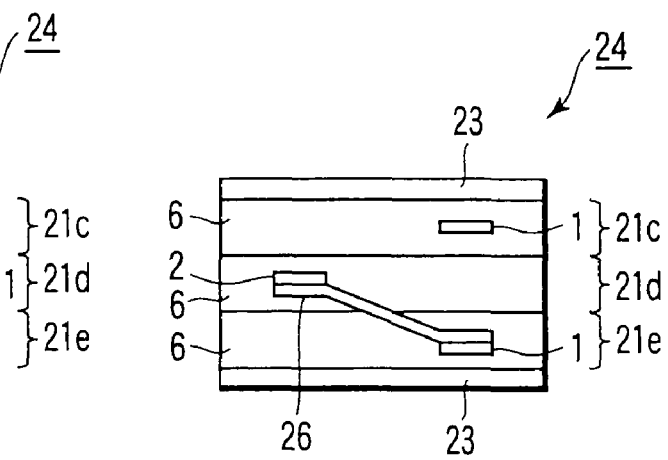
FIG. 8 is a side view of the battery module in FIG. 6 as seen from the opposite lead projecting side.

In FIG. 3, the single cells 21a, 21b are arranged side by side, but the single cells may be also stacked up. Such examples are shown in FIGS. 6 to 8.

Single cells 21c to 21e used have the same structure as shown in FIG. 3. FIG. 6 is a plan view of a battery module 24 as seen from above. FIG. 7 is a side view of the battery module 24 as seen from the upside of FIG. 6. FIG. 8 is a side view of the battery module 24 as seen from the downside of FIG. 6.

The battery module 24 has a series connection unit having single cells 21c to 21e connected in series. The single cells 21c to 21e are stacked up in the thickness direction thereof. The top layer is the single cell 21c, the bottom layer is the single cell 21e, and the middle layer is the single cell 21d. The single cell 21c and single cell 21e are arranged with the positive electrode terminal 2 upside in FIG. 6. The single cell 21d is arranged with the negative electrode terminal 1 upside in FIG. 6. As shown in FIG. 7, the positive electrode terminal 2 of the single cell 21c is electrically connected with the negative electrode terminal 1 of the single cell 21d drawn out in the same direction by means of a tab 25. Further, as shown in FIG. 8, the positive electrode terminal 2 of the single cell 21d is electrically connected with the negative electrode terminal 1 of the single cell 21e drawn out in the same direction by means of a tab 26. By such tab connection, the single cells 21e to 21e are connected in series. The cushion member 23 formed like a sheet is arranged on the surface of the cases 6 of the single cells 21c, 21e positioned in the outermost layers of the series connection unit.

The cushion member 23 can enhance the vibration resisting performance and impact resisting performance of the battery modules 20a, 24. By contrast, due to the cushion member, the volume energy density of the battery module may be lowered. Therefore, if the case 6 is formed of a rigid material such as metal, the cushion member may not be provided. The cushion member 23 is formed of, for example, a polymer material having a sponge structure. The polymer material is preferred to have both resistance to organic solvent and flame retardant property. The thickness of the cushion member 23 is preferred to be 1 mm or more and 10 mm or less.

The battery modules 20a, 24 can comprise a plurality of series connection units. These series connection units can be connected parallel to each other. In addition, the battery module contained in an outer case can be used as a battery pack. Necessary electronic parts such as a protective circuit board may be accommodated in the outer case of the battery pack.

Examples of the invention will be described below by referring to the above drawings.

It must be noted, however, that the invention is not limited to these examples alone as

Example 1

Preparation of Negative Electrode

By blending lithium titanate ($Li_4Ti_5O_{12}$) powder having an average primary particle size of 5 μm and Li intercalating potential of 1.55V (vs. $Li/Li^+$) as an active material, carbon powder with an average particle size of 0.4 micron as a conductive agent, and polyvinylidene fluoride (PVdF) as a binder by a ratio of 90:7:3 by weight, the mixture was dispersed in an n-methylpyrrolidone (NMP) solvent, and a slurry was prepared.

For measurement of primary particle size of the active material, a Laser Diffraction Particle Size Analyzer (model SALD-300 of Shimadzu Corporation) was used. About 0.1 g of a sample was put in a beaker, and a surfactant and 1 to 2 mL of distilled water were added, and was stirred sufficiently, and poured into a stirring tank. Light intensity distribution was measured 64 times at intervals of 2 seconds each, the particle size distribution data was analyzed, and the particle size of cumulative frequency distribution of 50% (D50) was obtained as the average primary particle size.

On the other hand, an aluminum foil (purity 99.99%) of thickness of 10 μm and average crystal grain size of 50 μm was prepared as a negative electrode current collector.

The slurry was applied on the obtained negative electrode current collector, and dried and pressed, and a negative electrode with electrode density of 2.4 $g/cm^3$ was prepared.

The negative electrode density was measured in the following method.

A negative electrode having both sides being negative electrode layers was cut in a size of 5 cm×5 cm, and the total weight and thickness of the electrode were measured. From both sides of the electrode, the negative electrode layers were stripped off by using acetone, and the weight and thickness of the current collector were measured. The negative electrode density ρ ($g/cm^3$) was calculated by formula (2).

$$\rho = (W_0 - W_1)/((T_0 - T_1) \times S)$$

where $W_0$ is electrode weight (g), $W_1$ is current collector weight (g), $T_0$ is electrode thickness (cm), $T_1$ is current collector thickness (cm), and S is negative electrode area, which is, in this case, 25 $cm^2$.

Preparation of Positive Electrode

By blending lithium cobalt oxide ($LiCoO_2$) as an active material, graphite powder as conductive agent, and polyvinylidene fluoride (PVdF) as binder by a ratio of 87:8:5 by weight, the mixture was dispersed in n-methylpyrrolidone (NMP) solvent, and a slurry was prepared. The slurry was applied on an aluminum foil (purity 99.99%) of thickness of 15 μm and average crystal grain size of 10 μm, and dried and pressed, and a positive electrode with electrode density of 3.5 g/cm³ was prepared.

As a material for forming a case (outer package), a laminate film containing aluminum of 0.1 mm in thickness was prepared. The aluminum layer of this laminate film containing aluminum was about 0.03 mm in thickness, and the average crystal grain size was about 100 μm. As the resin for reinforcing the aluminum layer, polypropylene was used. By processing the laminate film by heat fusion, the case (outer package) was obtained.

A belt-like positive electrode terminal was electrically connected to the positive electrode, and a belt-like negative electrode terminal was electrically connected to the negative electrode. A separator of polyethylene porous film of 12 μm in thickness was applied tightly to cover the positive electrode. The negative electrode was laid on the separator, thereby the separator was arranged between the positive electrode and the negative electrode. They were wound flatly, and an electrode group was prepared. The electrode group was pressed and formed flatly. The flatly formed electrode group was inserted into the case (outer package).

In an organic solvent mixing EC and GBL at a ratio by volume (EC:GBL) of 1:2, 1.5 mol/L of $LiBF_4$ of lithium salt was dissolved, and a liquid nonaqueous electrolyte was prepared. The obtained nonaqueous electrolyte was poured into the case, and a flat type nonaqueous electrolyte secondary battery of 3.8 mm in thickness, 63 mm in width and 95 mm in height having a structure as shown in FIG. 1 was prepared.

Examples 2 and 3

Nonaqueous electrolyte secondary batteries having the same structure as in Example 1 were manufactured except that the average primary particle size of the negative electrode active material and negative electrode density differed, as shown in Table 1. Examples 1 to 3 are intended to investigate the effect of average primary particle size of lithium titanate.

Examples 4 to 7

Nonaqueous electrolyte secondary batteries having the same structure as in Example 3 were manufactured except that the average crystal grain size of the negative electrode current collector and negative electrode density differed, as shown in Table 1. Examples 3 to 7 are intended to investigate the effect of average crystal grain size of Al.

Examples 8 to 10

Nonaqueous electrolyte secondary batteries having the same structure as in Example 7 were manufactured except that the average primary particle size of the negative electrode active material and negative electrode density differed, as shown in Table 1. Examples 7 to 10 are intended to investigate further effects of average primary particle size of lithium titanate.

Example 11

A nonaqueous electrolyte secondary battery having the same structure as in Example 9 was manufactured except that the average crystal grain size of the negative electrode current collector and negative electrode density differed, as shown in Table 1. Example 11 is intended to investigate the effect of combination of average crystal grain size of Al and average primary particle size of lithium titanate.

Example 12

A nonaqueous electrolyte secondary battery having the same structure as in Example 9 was manufactured except that an aluminum alloy foil of which composition, thickness and average crystal grain size are as shown in Table 1 was used as the negative electrode current collector, and that the average primary particle size of the negative electrode active material was as shown in Table 1.

Example 13

A nonaqueous electrolyte secondary battery having the same structure as in Example 9 was manufactured except that an aluminum alloy foil of which composition, thickness and average crystal grain size are as shown in Table 1 was used as the negative electrode current collector.

Example 14

A nonaqueous electrolyte secondary battery having the same structure as in Example 9 was manufactured except that an aluminum alloy foil of which composition, thickness and average crystal grain size are as shown in Table 1 was used as the negative electrode current collector, and that the negative electrode density was as shown in Table 1.

Examples 15 to 21

A metal case formed of a metal material of which composition and average crystal grain size are as shown in Table 1 with the wall thickness as shown in Table 1 was prepared as the outer package.

An electrode group having the same structure as in Example 9 and a nonaqueous electrolyte of same composition as in Example 1 were accommodated in the metal case, and a sealing plate was attached to the opening of the case by laser welding, and prismatic type nonaqueous electrolyte secondary batteries were manufactured. Examples 15 to 21 are

Example 22

A nonaqueous electrolyte secondary battery having the same structure as in Example 9 was manufactured except that an aluminum alloy foil of which composition, thickness and average crystal grain size are as shown in Table 1 was used as the negative electrode current collector, and that the negative electrode density was as shown in Table 1.

Examples 12 to 14 and 22 are intended to investigate the effect of using aluminum alloy foil as a negative electrode current collector.

Comparative Examples 1 to 3

Nonaqueous electrolyte secondary batteries having the same structure as in Example 3 were manufactured except that the negative electrode current collector as shown in Table 1 was used and that the negative electrode density was as shown in Table 1.

Comparative Example 4

A prismatic type nonaqueous electrolyte secondary battery having the same structure as in Example 20 was manufactured except that the negative electrode current collector and negative electrode active material as shown in Table 1 were used and that the negative electrode density was as shown in Table 1.

Comparative Example 5

A nonaqueous electrolyte secondary battery having the same structure as in comparative example 1 was manufactured except that the negative electrode current collector of which composition, thickness, and average crystal grain size as shown in Table 1 was used and that the average primary particle size of the negative electrode active material and negative electrode density were as shown in Table 1.

Comparative Example 6

A nonaqueous electrolyte secondary battery having the same structure as in comparative example 4 was manufactured except that the negative electrode current collector of which composition, thickness, and average crystal grain size as shown in Table 1 was used and that the average primary particle size of the negative electrode active material and negative electrode density were as shown in Table 1, and also that the composition of metal material composing the metal case and the thickness of metal case were as shown in Table 1.

Comparative Example 7

A nonaqueous electrolyte secondary battery having the same structure as in comparative example 1 was manufactured except that a copper foil of a thickness as shown in Table 1 was used as negative electrode current collector.

A method of manufacturing negative electrode current collector in Examples 1 to 22 and comparative examples 1 to 7 is explained below.

The negative electrode current collector in Example 1 was manufactured by using an aluminum foil (purity 99.99%) of thickness of 10 μm and average crystal grain size of 90 μm, annealing at 200° C., and quenching to room temperature. In Examples 2 and 3, the same negative electrode current collector as in Example 1 was used.

The negative electrode current collector in Examples 4 to 7 was manufactured in the same manner as in Example 1, except that the annealing temperature was changed as shown in Table 3. In Examples 8 to 10, the same negative electrode current collector as in Example 7 was used. In Example 11, the same negative electrode current collector as in Example 6 was used.

The negative electrode current collector in Example 12 was manufactured by using an aluminum alloy foil of thickness of 10 μm and average crystal grain size of 90 μm, with the composition as shown in Table 1, annealing at temperature shown in Table 3, and quenching to room temperature. The negative electrode current collector in Example 13 was manufactured by using an aluminum alloy foil of thickness of 5 μm and average crystal grain size of 90 μm, with the composition as shown in Table 1, annealing at temperature shown in Table 3, and quenching to room temperature. The negative electrode current collector in Example 14 was manufactured by using an aluminum alloy foil of thickness of 5 μm and average crystal grain size of 90 μm, with the composition as shown in Table 1, annealing at temperature shown in Table 3, and quenching to room temperature.

The negative electrode current collector in Examples 15 to 21 was manufactured in the same manner as in Example 7.

The negative electrode current collector in Example 22 was manufactured by using an aluminum alloy foil of thickness of 5 μm and average crystal grain size of 90 μm, with the composition as shown in Table 1, annealing at temperature shown in Table 3, and quenching to room temperature.

The negative electrode current collector in comparative examples 1 to 4 was manufactured by the aluminum foil with an average crystal grain size of 90 μm was annealing at temperature shown in Table 3. The negative electrode current collector in comparative examples 5 and 6 was manufactured by the aluminum alloy foil with an average crystal grain size of 90 μm was annealing at temperature shown in Table 3.

Nonaqueous electrolyte secondary batteries of Examples 1 to 22 and comparative examples 1 to 7 were evaluated by the following two tests.

One test is a rapid charging and over discharging cycle test conducted in a high temperature atmosphere of 45° C., in which after a constant voltage charging at 2.8V for 30 minutes, a constant current discharge of 2 A was until 0V. The number of cycles was counted when the capacity maintenance rate became 80%.

The other test is a high rate discharge test conducted in an atmosphere of 20° C., in which after a constant voltage charging at 2.8V for 30 minutes, a constant current discharge of 10 A was until 0V. Initial discharge capacity, capacity maintenance rate, and maximum battery temperature were measured. The capacity maintenance rate is indicated by the 2 A discharge capacity supposed to be 100.

The negative electrode density shown in Table 1 is the value obtained in the process of manufacturing a negative electrode. After manufacturing the negative electrode, it is also pressed in the forming process of electrode group, but such pressing has no effect on the negative electrode density.

TABLE 1

| | Negative electrode | | | | | Case | | |
|---|---|---|---|---|---|---|---|---|
| | Current collector | | | Active material | Negative electrode density $(g/cm^3)$ | | | |
| | Composition | Thickness (μm) | Al average crystal grain size (μm) | Average particle size (μm) | | Material | Al average crystal grain size (μm) | Thickness (mm) |
| Example 1 | Al | 10 | 50 | 5.0 | 2.40 | Laminate film containing Al | 100 | 0.10 |
| Example 2 | Al | 10 | 50 | 3.0 | 2.30 | Laminate film containing Al | 100 | 0.10 |
| Example 3 | Al | 10 | 50 | 1.0 | 2.20 | Laminate film containing Al | 100 | 0.10 |

TABLE 1-continued

| | | | | | | | | |
|---|---|---|---|---|---|---|---|---|
| Example 4 | Al | 10 | 40 | 1.0 | 2.30 | Laminate film containing Al | 100 | 0.10 |
| Example 5 | Al | 10 | 30 | 1.0 | 2.35 | Laminate film containing Al | 100 | 0.10 |
| Example 6 | Al | 10 | 20 | 1.0 | 2.40 | Laminate film containing Al | 100 | 0.10 |
| Example 7 | Al | 10 | 10 | 1.0 | 2.45 | Laminate film containing Al | 100 | 0.10 |
| Example 8 | Al | 10 | 10 | 0.8 | 2.50 | Laminate film containing Al | 100 | 0.10 |
| Example 9 | Al | 10 | 10 | 0.5 | 2.50 | Laminate film containing Al | 100 | 0.10 |
| Example 10 | Al | 10 | 10 | 0.3 | 2.45 | Laminate film containing Al | 100 | 0.10 |
| Example 11 | Al | 10 | 20 | 0.5 | 2.40 | Laminate film containing Al | 100 | 0.10 |
| Example 12 | Al—Mg(0.1%) | 10 | 3 | 0.3 | 2.50 | Laminate film containing Al | 100 | 0.10 |
| Example 13 | Al—Mn(0.1%)—Mg(0.1%) | 5 | 10 | 0.5 | 2.50 | Laminate film containing Al | 100 | 0.10 |
| Example 14 | Al—Zn(0.1%) | 5 | 10 | 0.5 | 2.40 | Laminate film containing Al | 100 | 0.10 |

| | Negative electrode | | | | | | | |
|---|---|---|---|---|---|---|---|---|
| | Current collector | | | Active material | Negative electrode density $(g/cm^3)$ | Case | | |
| | Composition | Thickness ($\mu$m) | Al average crystal grain size ($\mu$m) | Average particle size ($\mu$m) | | Material | Al average crystal grain size ($\mu$m) | Thickness (mm) |
| Example 15 | Al | 10 | 10 | 0.5 | 2.50 | Al | 60 | 0.28 |
| Example 16 | Al | 10 | 10 | 0.5 | 2.50 | Al | 50 | 0.25 |
| Example 17 | Al | 10 | 10 | 0.5 | 2.50 | Al—Mn(1%) | 40 | 0.18 |
| Example 18 | Al | 10 | 10 | 0.5 | 2.50 | Al—Mn(1%) | 30 | 0.16 |
| Example 19 | Al | 10 | 10 | 0.5 | 2.50 | Al—Mn(1%) | 20 | 0.15 |
| Example 20 | Al | 10 | 10 | 0.5 | 2.50 | Al—Mn(1%)—Mg(1%) | 10 | 0.10 |
| Example 21 | Al | 10 | 10 | 0.5 | 2.50 | Al | 10 | 0.10 |
| Example 22 | Al—Fe(1.5%)—Si(0.1%) | 5 | 2 | 0.5 | 2.55 | Laminate film containing Al | 100 | 0.10 |
| Comparative example 1 | Al | 20 | 100 | 1.0 | 2.00 | Laminate film containing Al | 100 | 0.10 |
| Comparative example 2 | Al | 10 | 70 | 1.0 | 2.10 | Laminate film containing Al | 100 | 0.10 |
| Comparative example 3 | Al | 10 | 60 | 1.0 | 2.10 | Laminate film containing Al | 100 | 0.10 |
| Comparative example 4 | Al | 20 | 100 | 5.0 | 2.20 | Al—Mn(1%)—Mg(1%) | 10 | 0.10 |
| Comparative example 5 | Al—Cu(1%) | 20 | 100 | 5.0 | 2.20 | Laminate film containing Al | 100 | 0.10 |
| Comparative example 6 | Al—Cu(1%) | 20 | 100 | 5.0 | 2.30 | Al—Cu(1%) | 100 | 0.30 |
| Comparative example 7 | Cu | 12 | — | 1.0 | 2.00 | Laminate film containing Al | 100 | 0.10 |

TABLE 2

| | Cycle test of high temperature rapid charging and over discharging (40° C.) Number of cycles | High rate discharge test (20° C.) | | |
|---|---|---|---|---|
| | | Initial discharge capacity (Ah) | Capacity maintenance rate (%) | Maximum battery temperature (° C.) |
| Example 1 | 700 | 1.90 | 50 | 40 |
| Example 2 | 750 | 1.85 | 55 | 40 |
| Example 3 | 800 | 1.80 | 70 | 40 |
| Example 4 | 850 | 1.85 | 75 | 40 |
| Example 5 | 900 | 1.90 | 75 | 40 |
| Example 6 | 950 | 1.95 | 75 | 40 |
| Example 7 | 1000 | 2.00 | 75 | 39 |
| Example 8 | 1000 | 2.00 | 77 | 40 |
| Example 9 | 1000 | 2.00 | 80 | 38 |
| Example 10 | 1200 | 1.98 | 90 | 35 |
| Example 11 | 1000 | 1.95 | 75 | 39 |
| Example 12 | 1500 | 2.00 | 90 | 36 |

TABLE 2-continued

|  | Cycle test of high temperature rapid charging and over discharging (40° C.) Number of cycles | High rate discharge test (20° C.) | | |
|---|---|---|---|---|
|  |  | Initial discharge capacity (Ah) | Capacity maintenance rate (%) | Maximum battery temperature (° C.) |
| Example 13 | 1000 | 2.30 | 85 | 38 |
| Example 14 | 1000 | 2.25 | 85 | 38 |
| Example 15 | 1000 | 1.85 | 80 | 43 |
| Example 16 | 1000 | 1.90 | 80 | 38 |
| Example 17 | 1000 | 2.00 | 80 | 34 |
| Example 18 | 1000 | 2.05 | 80 | 32 |
| Example 19 | 1000 | 2.10 | 80 | 30 |
| Example 20 | 1000 | 2.20 | 80 | 25 |
| Example 21 | 1000 | 2.10 | 80 | 25 |
| Example 22 | 1000 | 2.35 | 90 | 39 |
| Comparative example 1 | 500 | 1.60 | 60 | 50 |
| Comparative example 2 | 300 | 1.60 | 40 | 50 |
| Comparative example 3 | 350 | 1.65 | 45 | 50 |
| Comparative example 4 | 600 | 1.80 | 30 | 45 |
| Comparative example 5 | 200 | 1.80 | 30 | 48 |
| Comparative example 6 | 300 | 1.70 | 30 | 45 |
| Comparative example 7 | 50 | 1.60 | 60 | 50 |

TABLE 3

|  | Annealing temperature (° C.) |
|---|---|
| Example 1 | 200° C. |
| Example 2 | Same as in Example 1 |
| Example 3 | Same as in Example 1 |
| Example 4 | 180° C. |
| Example 5 | 160° C. |
| Example 6 | 150° C. |
| Example 7 | 140° C. |
| Example 8 | Same as in Example 7 |
| Example 9 | Same as in Example 7 |
| Example 10 | Same as in Example 7 |
| Example 11 | 150° C. |
| Example 12 | 100° C. |
| Example 13 | 130° C. |
| Example 14 | 120° C. |
| Example 15 | Same as in Example 7 |
| Example 16 | Same as in Example 7 |
| Example 17 | Same as in Example 7 |
| Example 18 | Same as in Example 7 |
| Example 19 | Same as in Example 7 |
| Example 20 | Same as in Example 7 |
| Example 21 | Same as in Example 7 |
| Example 22 | 100° C. |
| Comparative example 1 | 350° C. |
| Comparative example 2 | 320° C. |
| Comparative example 3 | 300° C. |
| Comparative example 4 | 350° C. |
| Comparative example 5 | 350° C. |
| Comparative example 6 | 350° C. |
| Comparative example 7 | No annealing |

As can be seen from Table 2, the nonaqueous electrolyte secondary batteries in Examples 1 to 22 having the negative electrode current collector comprising aluminum foil or aluminum alloy foil with average crystal grain size of 50 μm or less are known to be superior in the high temperature cycle performance of rapid charging and over discharging, initial discharge capacity, capacity maintenance rate in high rate discharge, and battery temperature performance, as compared with comparative examples.

Test results regarding the negative electrode current collector are explained below.

In comparison between comparative examples 2 and 3 and Examples 3 to 7, it is known that the high temperature cycle performance of rapid charging and over discharging, initial discharge capacity, capacity maintenance rate in high rate discharge, and battery temperature performance are enhanced when the Al crystal grain size of the current collector is 50 μm or less. Between comparative example 3 having an Al crystal grain size of 60 μm and Example 3 of 50 μm, the cycle count of high temperature rapid charging and over discharging is increased from 350 times to 800 times, the initial discharge capacity is increased from 1.65 Ah to 1.80 Ah, the capacity maintenance rate in high rate discharge is increased from 45% to 70%, and the maximum battery temperature is lowered from 50° C. to 40° C.

Since comparative examples 2 and 3 were manufactured at a higher pressing force than in comparative example 1, the electrode density is therefore higher. This pressing force was higher than the pressure of the withstanding limit of the negative electrode current collector in comparative examples 2 and 3, the current collector was broken, and the negative electrode deteriorated. As a result, the cycle count of high temperature rapid charging and over discharging and capacity maintenance rate in high rate discharge are lower. On the other hand, in Example 3, in which the Al crystal grain size of the current collector is 50 μm or less, since the strength of the current collector is greatly increased, in spite of the higher negative electrode density than in comparative example 2, the cycle count of high temperature rapid charging and over discharging and capacity maintenance rate in high rate discharge are improved.

In comparison between Example 10 and Example 12, when the aluminum crystal grain size of the current collector is 3 μm or less, it is known that the cycle count of high temperature rapid charging and over discharging is further increased from 1200 times to 1500 times. Also in comparison between Example 10 and Examples 12 to 14 and 22, in the case of the negative electrode current collector made of aluminum alloy, as the strength is increased, a higher density is realized, and the initial discharge capacity is increase from 1.98 Ah to about 2.35 Ah. Especially in the Al—Fe—Si alloy in Example 22, since the Al average crystal grain size is further reduced to 2 μm, the tensile strength is excellent. Hence, at the thickness of the negative electrode current collector at 5 μm, when the negative electrode density is raised to 2.55 g/cm$^3$ by increasing the pressing force, elongation of the current collector is suppressed, and the negative electrode is further reduced in thickness and increased in density.

Test results regarding negative electrode active material are explained below.

In Examples 1 to 3, it is known that the capacity maintenance rate in high rate discharge is enhanced when the average primary particle size of lithium titanate used as the negative electrode active material is 1 micron or less. In comparison between Example 2, in which the average primary particle size of lithium titanate is 3.0 μm and Example 3 of 1.0 micron, the capacity maintenance rate is improved from 55% to 70%. In Examples 7 to 10, when the average primary particle size of lithium titanate used as negative electrode active material is 0.3 micron or less, the high temperature cycle performance of rapid charging and over discharging, capacity maintenance rate in high rate discharge, and battery temperature performance are further improved. In comparison between Example 7, in which the average primary particle size of lithium titanate is 1.0 micron, and Example 10 of 0.3 micron, the cycle count of high temperature rapid charging and over discharging is increased from 1000 times to 1200 times, the capacity maintenance rate is improved from 75% to 90%, and the maximum battery temperature is lowered from 39° C. to 35° C.

Finally, test results regarding outer packages are discussed.

In comparison of Examples 15 to 21, the battery temperature performance is improved when the Al average crystal grain size of the outer package is 50 μm or less. In comparison between Example 15, in which the Al average crystal grain size of the outer package is 60 μm and Example 16 of 50 μm, the maximum battery temperature is lowered from 43° C. to 38° C. Owing to this, in Examples 15 to 21, the metal case is used as the outer package, and as compared with Examples 1 to 14 and 22, it is advantageous in the point that the energy density per unit volume is higher.

In Examples 20 and 21, when the Al average crystal grain size is 10 μm or less, the strength is further increased, and a thickness of 0.1 mm is realized, which is the same as in the conventional laminate film containing aluminum, and the energy density is further enhanced. In Examples 20 and 21, further, the maximum battery temperature in high rate discharging is 25° C., and elevation from initial temperature could be suppressed at 5° C. In Examples 1 to 16 and 22, the maximum battery temperature was about 40° C., and elevation from initial temperature was about 20° C., and in the comparative examples, the minimum value was 45° C., which was raised by 25° C. from the initial temperature. Hence, by controlling the Al average crystal grain size of the metal material for composing the outer package in the range of 10 μm or less, it can be seen that the improvement of battery temperature performance is excellent.

As described herein, one embodiment of the invention presents a nonaqueous electrolyte secondary battery of excellent battery capacity characteristic and cycle performance even under the conditions of a high temperature environment, rapid charging, and high rate discharging.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A nonaqueous electrolyte secondary battery comprising:
a case;
a nonaqueous electrolyte provided in the case;
a positive electrode provided in the case; and
a negative electrode provided in the case, the negative electrode comprising a negative electrode current collector and a negative electrode layer that is carried on the negative electrode current collector and contains negative electrode active material particles, and the negative electrode current collector having a thickness of 20 μm or less and including an aluminum foil having an average crystal grain size of 0.01 to 50 μm or an aluminum alloy foil having an average crystal grain size of 0.01 to 50 μm.

2. The nonaqueous electrolyte secondary battery according to claim 1, wherein an average primary particle size of the negative electrode active material particles is 0.001 to 1 μm.

3. The nonaqueous electrolyte secondary battery according to claim 2, wherein the average primary particle size is 0.001 to 0.3 μm.

4. The nonaqueous electrolyte secondary battery according to claim 1, wherein the negative electrode active material particles have a lithium insertion potential falling within a range of 0.4 to 3 V (vs. Li/Li$^+$).

5. The nonaqueous electrolyte secondary battery according to claim 1, wherein the negative electrode active material particles include lithium titanium composite oxide particles.

6. The nonaqueous electrolyte secondary battery according to claim 5, wherein a composition of lithium titanium composite oxide particles is expressed in $Li_{4+x}Ti_5O_{12}$, where x is in a range of $-1 \leq x \leq 3$.

7. The nonaqueous electrolyte secondary battery according to claim 1, wherein the average crystal grain size of the aluminum foil and the aluminum alloy foil is 0.1 to 3 μm.

8. The nonaqueous electrolyte secondary battery according to claim 1, wherein the aluminum alloy foil is formed of an alloy containing aluminum and at least one element selected from the group consisting of iron, magnesium, zinc, manganese, and silicon.

9. The nonaqueous electrolyte secondary battery according to claim 8, wherein a content of aluminum in the alloy is 95 to 98.5 wt. %.

10. The nonaqueous electrolyte secondary battery according to claim 1, wherein the thickness is 12 μm or less.

11. The nonaqueous electrolyte secondary battery according to claim 1, wherein the case is made of aluminum having an average crystal grain size of 0.01 to 50 μm or aluminum alloy having an average crystal grain size of 0.01 to 50 μm.

12. The nonaqueous electrolyte secondary battery according to claim 11, wherein the average crystal grain size of aluminum and aluminum alloy is 0.1 to 10 μm.

13. The nonaqueous electrolyte secondary battery according to claim 1, wherein the positive electrode comprises a positive electrode current collector including an aluminum foil having an average crystal grain size of 0.01 to 50 μm or an aluminum alloy foil having an average crystal grain size of 0.01 to 50 μm.

14. The nonaqueous electrolyte secondary battery according to claim 1, wherein the nonaqueous electrolyte contains γ-butyrolactone.

15. A battery pack comprising the nonaqueous electrolyte secondary battery according to claim 1.

16. A battery module comprising single cells, each single cell comprising:
a case;
a nonaqueous electrolyte provided in the case;
a positive electrode provided in the case; and
a negative electrode provided in the case, the negative electrode comprising a negative electrode current collector and a negative electrode layer that is carried on the negative electrode current collector and contains negative electrode active material particles, and the negative electrode current collector having a thickness of 20 μm or less and including an aluminum foil having an average crystal grain size of 0.01 to 50 μm or an aluminum alloy foil having an average crystal grain size of 0.01 to 50 μm.

17. The battery module according to claim 16, wherein the thickness is 12 μm or less.

18. The battery module according to claim 16, further comprising a series connection unit having single cells connected in series, and a cushion member which covers a principal plane of the series connection unit.

19. The battery module according to claim 16, further comprising a series connection unit having single cells connected in series, and wherein the single cells are stacked in a thickness direction.

20. The battery module according to claim 19, further comprising a cushion member which covers the single cell of the outermost layer of the series connection unit.

\* \* \* \* \*